May 20, 1930.   L. P. GREEN   1,759,505
SCRAPER
Original Filed May 10, 1926   3 Sheets-Sheet 2
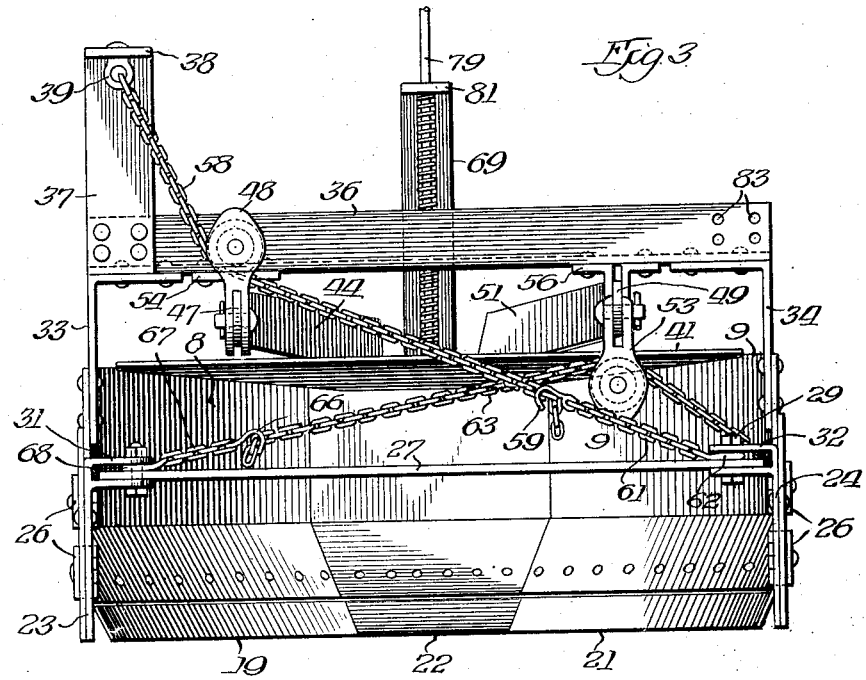
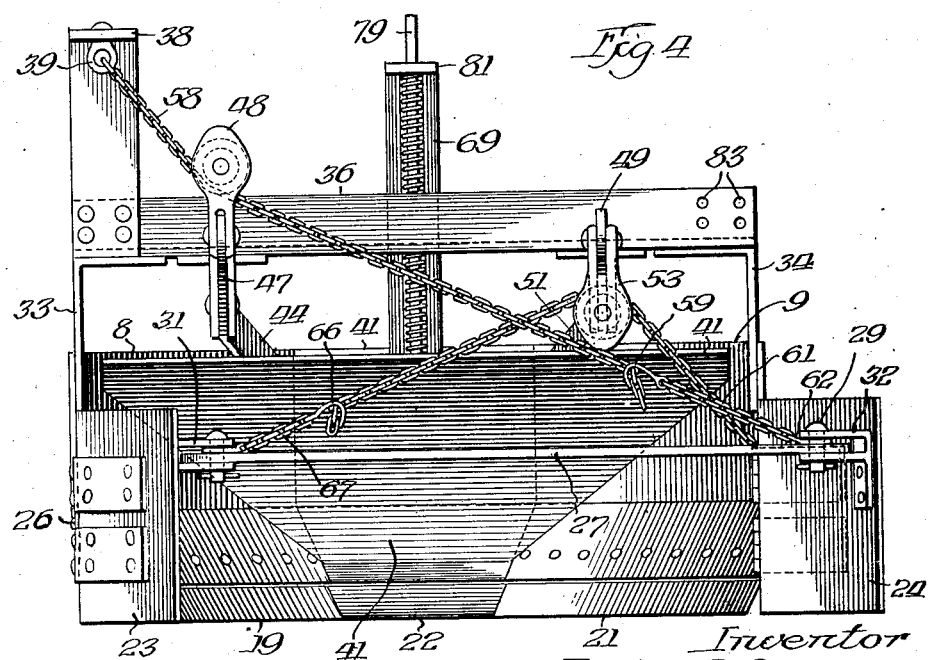
Inventor
Leslie P Green
By Ira J. Wilson
Atty
Witness:

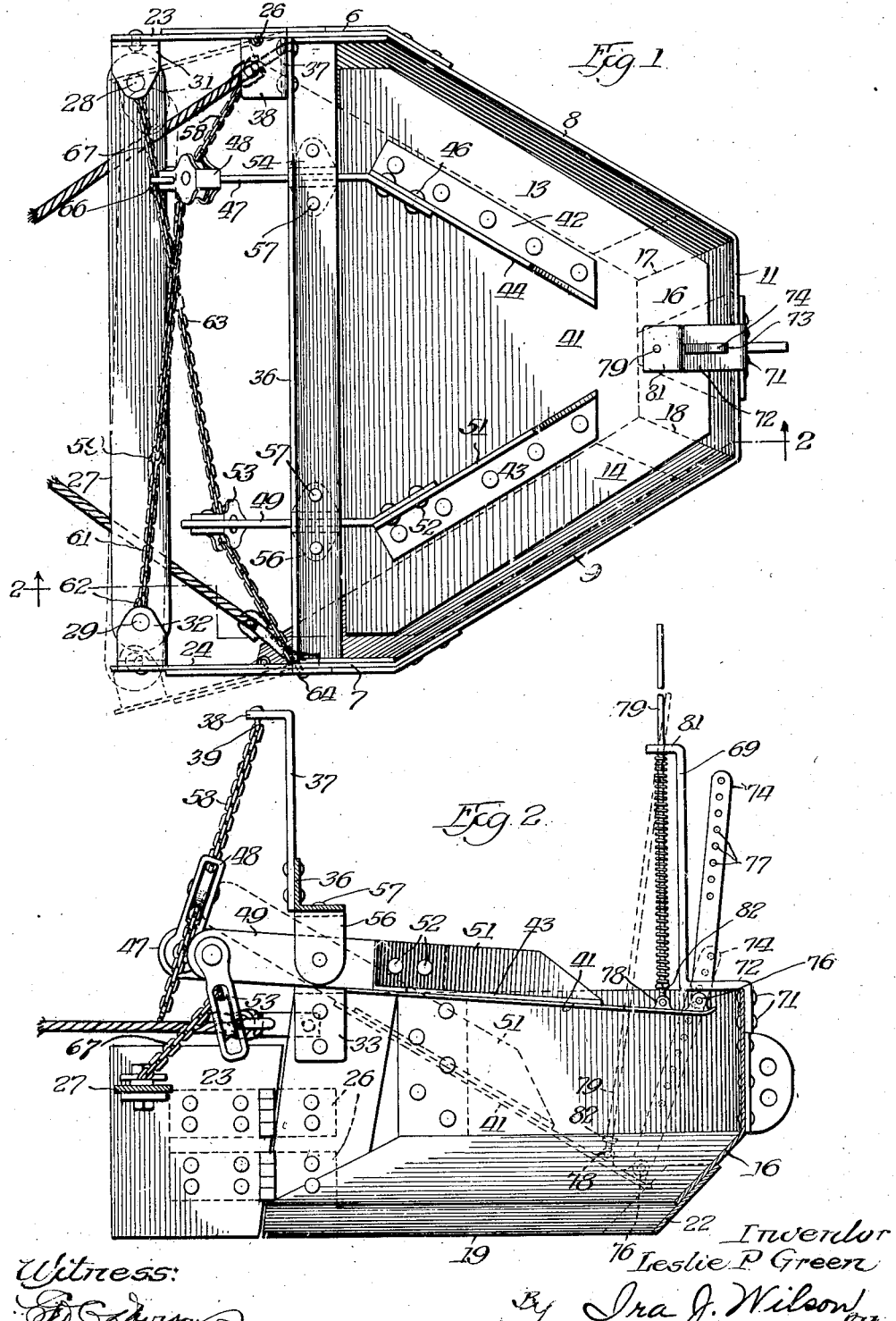

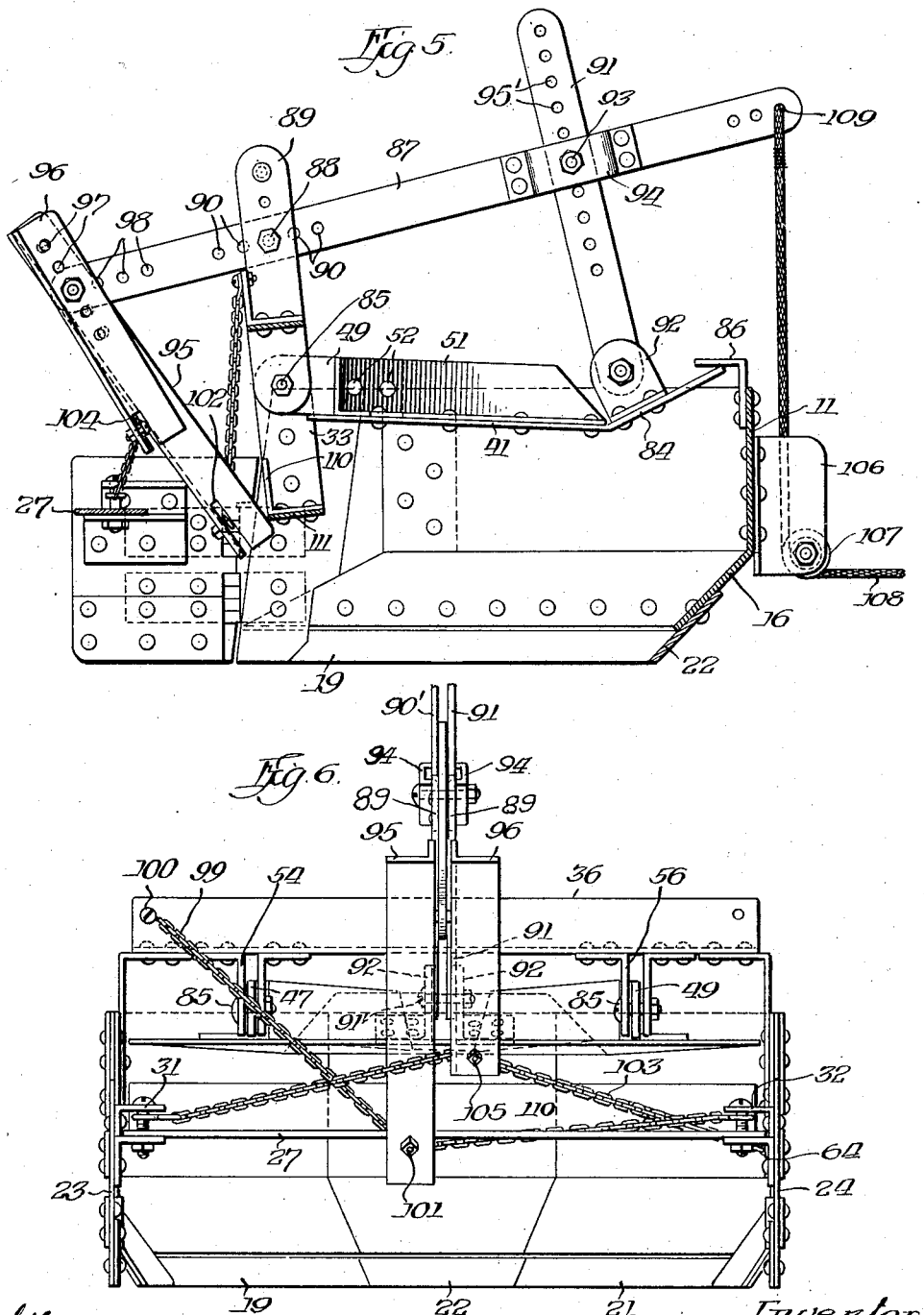

Patented May 20, 1930

1,759,505

UNITED STATES PATENT OFFICE

LESLIE P. GREEN, OF CHICAGO, ILLINOIS, ASSIGNOR, BY MESNE ASSIGNMENTS, TO IRA J. WILSON, OF WINNETKA, ILLINOIS

SCRAPER

Application filed May 10, 1926, Serial No. 107,874. Renewed April 12, 1930.

My invention relates to scrapers of the drag type especially adapted for service in excavating, stripping, leveling, and the like, and is of the type known in the trade as the bottomless scraper.

This invention contemplates, and has as one of its primary objects, a novel construction whereby undermining or side cutting can be accomplished automatically by the co-operation of the parts, so that material may be taken from an area a considerable distance on each side of the line of front and rear drag cables connected to the scraper.

Another object of my invention is to provide a bottomless scraper of the drag type in which the amount of load carried thereby may be predeterminately fixed at any point between 50 and 100% of the maximum capacity and while a scraper of this type has been shown and described in my copending application filed February 13, 1926, Serial No. 88,007, and particularly in Figs. 7 and 8 of said application, this invention contemplates in combination with and controlled by the load control member, mechanism whereby undercutting or side cutting may be performed.

To these ends my invention consists in the novel combination and construction of the parts as more specifically set forth and described in the following specification and claims when considered in connection with the accompanying drawings in which:

Fig. 1 is a top plan view of my improved scraper showing the control member in its raised position, Fig. 2 is a longitudinal sectional view on the line 2—2 of Fig. 1, Fig. 3 is a front elevation of my improved scraper showing the control member in raised position and the cutting members extending in line with the outer ends of the forward parts of the scraper walls, Fig. 4 is a like view showing the control member in its lower position in the scraper and the cutting members thrown parallel to each other and at an angle to the forward ends of the walls of the scraper.

Fig. 5 is a longitudinal cross sectional view of a modified form, and

Fig. 6 is a front elevational view showing the construction of the scraper shown in Fig. 5.

Like symbols of reference herein indicate like parts in each of the figures of the drawing.

For the purpose of illustration, I have shown one form of scraper in which I have embodied my invention, but it will be understood that I do not limit myself to any particular shape of scraper, as the principles of my invention can be applied to scrapers of many different shapes. In the form which I have shown in the drawings the scraper body has two side walls having parallel front ends 6 and 7 with diverging portions 8 and 9 respectively and a rear wall 11 extending transversely of the scraper and uniting the diverging portions 8 and 9. These side walls are preferably made from a single sheet of heavy metal cut and bent to the desired shape, although in some instances, they are formed separately and connected by rivets or bolts. The lower portions of the side walls are bent inwardly, as indicated by the reference characters 13 and 14, and the corresponding portion of the rear wall 11 is bent forwardly as indicated by reference character 16. The metal, below the bent line of these walls, is cut away at the juncture of the rear and side walls, so as to provide tight joints along the lines 17 and 18. Wear plates 19, 21, and 22, may be securely attached by rivets, bolts, or the like, to the inclined portions 13, 14, and 16 of the side and rear walls, and these plates project beneath the lower edges of the said walls and end as shown in the drawings, thus providing hardened cutting and scraping edges possessing greater durability under wear than the metal of which the walls themselves are formed, and by so constructing the scraper, the wear plates have the additional advantage that they may be removed and replaced by others when they become worn out or broken.

At the front of the straight portions 6 and 7, the scraper is provided with a cutting plate 23 and 24 respectively, and each of said plates is fastened to said straight portions by a pair of hinges 26, and the pintles of said hinges are substantially at the joining point of said plates. The plates are also tied together by a bar 27 which is pivotally mounted at the points 28 and 29 in small brackets 31 and 32 on said plates. Extending up from the straight portions 6 and 7 at the front of the scraper are the angular members 33 and 34, and these members are connected by an angular bar 36 which extends the full width of said scraper and which is provided at one side of the same with an upright bar 37 which has its upper end bent to form the angular portion 38 to which an eyelet 39 is attached. Within the scraper is a load control plate 41, and this plate is substantially the same shape as the area included between the straight portions 6 and 7 of the side walls, the diverging portions 8 and 9 and rear wall 11 and this plate is provided on its upper surface with angle bars 42 and 43, and the upright leg 44 of the angle bar 42 has fastened thereto by the rivets 46 an extension plate 47 on the outer end of which is located a sheave 48. The angle bar 43 has an extension bar 49 secured to its upright leg 51 by rivets 52, and the outer end of this extension bar is also provided with a sheave 53. The extension bars 47 and 49 are pivotally mounted in brackets 54 and 56 which are secured to the under face of the angle bar 36 by suitable bolts or rivets 57.

A chain 58 is fastened in the eyelet 39, passes under the sheave 48, and is engaged by a grab hook 59 fastened on a short length of chain 61 whose other end is connected in any suitable manner with a link 62 on the bracket 32. A chain 63 is fastened in any suitable manner onto the eyelet 64 on the inside of the straight portion 7, and this chain passes over the sheave 53 and is engaged by the grab hook 66 on one end of a short length of chain 67 which has its other end fastened in the link 68 in the bracket 31. These grab hooks 59 and 66, are adapted to engage their respective chains at any desired point, and the chain is prevented from slipping by the links on each side of the hook. The rear wall of the scraper is provided with an upright member 69 which is secured to said rear wall by the rivets 71, and the horizontal portion 72 is provided with a slot 73 through which a limiting bar 74 is adapted to extend, and said limiting bar is pivotally mounted at its lower end in the boss 76 on the upper face of said load control plate. The limiting bar 74 has a series of holes 77 throughout its length and a bolt may be placed through any one of these holes so as to strike against the horizontal portion 72 of the member 69 to limit the upward movement of the load control plate. The load control plate 41 is also provided with a boss 78 for anchoring the tension rod 79 and said rod extends through the overhanging portion 81 of the member 69 and is provided with a spiral spring fitting between the said overhanging portion 81, and a nut 82 located near the bottom of said rod.

The operation of my improved scraper is as follows: Considering the load control plate 41 in the position shown in the dotted lines in Fig. 2, the cutting plates 23 and 24 will be thrown to an angle such as is shown by the dotted lines in Fig. 1, so that as the scraper is dragged forward by the usual cables (not shown) the angular position of the cutting plates will tend to throw the scraper out of line with the drag cables and thus perform side cutting and undercutting in case of a hillside. As the material enters beneath the load control plate 41, said plate is raised and will continue to rise to the position shown by the full lines in Fig. 2, provided its elevation has not been limited by the limiting bar 74. When the plate is in the position shown in the full lines in Fig. 2, the chains 58 and 63 will have drawn the cutting plates 23 and 24 back to the position shown by the full lines in Fig. 1, and the scraper will have been drawn back into its aligned position between the drag cables. Scrapers of this type are either drawn over a hopper in order to dump the contents, or are drawn backward by a rear drag cable to back off and when the load has been deposited from my type of scraper, the weight of the load control plate will automatically be sufficient to cause the plate to drop to the position shown by the dotted lines in Fig. 2, and if necessary, counterweights can be placed on the rear of said plate, or the tension rod and spring device shown in the drawings may be employed. This is intended to insure the falling of the control plate into the bottom of the scraper when the same has been emptied, and the fall of the plate will raise the forward end of the extension bars 47 and 49, and as the sheaves on the ends of each of these bars are in the bight of the chains 58 and 63, the chain 63 will draw the cutting plate 23 around to the position shown by the dotted line in Fig. 1, and by reason of the connection of the cutting plate 24 with the cutting plate 23 through the connecting bar 27, both cutting plates will be thrown to the angle shown by the dotted lines in Fig. 1.

As the control plate is raised, the forward ends of the extension bars 47 and 49 will be lowered, and the sheave 48 acting in the bight of the chain 58 will draw the cutting plate 24, and on account of its connection, the cutting plate 23 will also be drawn around the position shown by the full lines in Fig. 1.

It is understood that the upright bar 37 may be changed to the other end of the angle bar 36 and fastened thereto through the holes 83, and the chains connected up in just the opposite manner, in order to provide for side cutting in an opposite direction. It will also be understood that the drag chains will be connected in this type of scraper with the inside of the walls in such a manner that they will not interfere with the operation of the side cutting plates.

In the modified construction shown in Figs. 5 and 6, I have shown the load control plate 41 provided with an upwardly inclined tail portion 84. The control plate is pivotally attached to the angular bar 36 by the extension bars 47 and 49 which in turn have their forward ends pivoted as shown at 85 to the brackets 54 and 56 respectively. The load control plate 41 is limited in its upward movement with respect to the scraper by an L shaped bracket 86 which is secured to the rear wall 11 of the scraper and is positioned to engage the tail portion 84 as shown in Fig. 5. The mechanism for controlling the angularity of the cutting plates 23 and 24 in the construction shown in Figs. 5 and 6 comprises a longitudinally extending lever 87 which is pivoted intermediate its ends as shown at 88 between two vertically extending members 89 secured to the transverse angular member 36. The lever 87 is provided with a plurality of apertures 90 so that the fulcrum of the lever may be changed to these various apertures in adjusting the operative relation between the cutting plates 23—24 and the load control plate 41. The lever 87 is operatively connected with the control plate 41 by means of two spaced apart connecting bars 90'—91 which have their lower ends pivotally connected by means of a bolt 91' to spaced apart brackets 92 which in turn are secured to the rear end of the control plate 41. These connecting bars 90'—91 are connected adjacent to the rear end of and on the opposite side of the lever 87 by means of a bolt 93 which extends through registering apertures in the lever and in the brackets 94 which are secured to the opposite sides of the lever. The connecting bars 90'—91 are provided with a plurality of apertures 95' for adjusting the control plate with respect to the lever for permitting the changing of the operative relation between the cutting knives and the control plate. Pivotally secured to the forward end of the lever 87 and preferably on the opposite sides thereof are two angle members 95 and 96. These angle members are provided with a plurality of apertures 97 whereby they may be adjusted with respect to the lever 87. Additional apertures 98 are provided on the forward end of the lever 87 so that the angle members 95 and 96 respectively may be adjusted relative to the fulcrum 88 of the lever in controlling the angle through which the cutting plates 23 and 24 respectively may be swung. The lower end of angle member 95 is operatively connected to the cutting plate 24 by means of a chain 99 which has one end secured as shown at 100 to the transverse angle bar 36 and the other end thereof secured to the bracket 32. The intermediate portion of the chain 99 is secured by means of a bolt 101 in a slot 102 formed in the lower end of the angle member 95. A second chain 103 is secured to the side wall 7 by means of an eyelet 64. The other end of the chain 103 is secured to the bracket 31 of the cutting plate 23. The intermediate portion of the chain 103 is secured in the slot 104 in the lower end of the angle member 96 by means of a bolt 105.

Secured to the rear end of the scraper is a bracket 106 in which is journaled a sheave 107. Trained about the sheave 107 is a rear drag cable 108 which extends upwardly and is connected to the rear end of the lever 87 as shown in 109.

In order to reinforce and strengthen the forward portion or side walls 6 and 7, I have provided an additional brace or angle member 110 which is located midway of the height of the walls and secured adjacent the forward edges of the walls to inwardly extending portions 111 which are formed integrally with the brackets 33 and 34 respectively.

The operation of my scraper shown in the modified form in Figs. 5 and 6 is as follows: Assuming that the load control plate 41 is in its lowermost position or a position similar to that shown in Fig. 2, the rear end of the lever 87 will be in a position horizontally below its fulcrum 88, with the lifting angle members 95 and 96 in their elevated positions. In this position the tension on the chain 99 will be released or the bight in the chain reduced. At the same time, the bight in the chain 103 will be raised thereby swinging the cutter plate 23 inwardly with respect to the wall of the scraper and by reason of the tie bar 27 connecting the cutter plates 23 and 24 respectively, these cutter plates will be moved simultaneously. When the cutter plates and the load control plate 41 are in this assumed position, as the material enters below the load control plate 41, the plate will continue to rise until is assumes the position shown in Fig. 5 where the tail portion 84 engages the stop 86. When the plate 41 is in this position, the chain 99 will have drawn the cutter plates 23 and 24 back to the position shown in Figs. 5 and 6 and the scraper will have been drawn back into the lined position between the drag cables. In order to discharge the load from the scraper from my modified forms shown in Figs. 5 and 6, the scraper is drawn rearwardly by the rear drag cable 108 thereby depressing the control plate 41 within the scraper and discharging the contents thereof through the bottom of the scraper in the manner described in my co-pending application above referred to.

I do not limit myself to the constructions shown in this application, as various other methods may be employed for providing a cooperative movement between the control plate and the cutting plates. This, however, is one of the important features of this invention and I claim any method whereby the control plate, by its movement, controls the angle at which the cutting plates are disposed.

Various other modifications and changes in the design and construction of my improved scraper will undoubtedly suggest themselves to persons skilled in this art, and while I have shown and described a preferred form of my invention, it should be manifest that the invention is capable of a wide range of variations without departing from the scope thereof as defined in the following claims.

I claim:

1. In a bottomless drag scraper, a load control member pivoted at its forward end to the upper front end of said scraper and having its rear end normally resting in the bottom of said scraper and adapted to be raised by the entrance of material under said member, and means for limiting the upward movement of said member to thereby control the amount of material carried by said scraper.

2. In a bottomless drag scraper, a cross bar connecting the upper forward ends thereof, a load control member having arms rigidly secured thereto and pivotally mounted on said bar to permit the rear end of said member to be normally moved from the bottom to the top of said scraper by the material entering the same, and means for limiting the upward movement of said member to thereby control the amount of material carried by said scraper.

3. In a bottomless drag scraper, a load control member pivoted at its forward end to the upper front end of said scraper and having its rear end normally resting in the bottom of said scraper and adapted to be raised by the entrance of material under said member, and a bar on the rear end of said member having means thereon for limiting the upward movement of said member to thereby control the amount of material carried by said scraper.

4. In a bottomless drag scraper, a load control member pivoted at its forward end to the upper front end of said scraper and having its rear end normally resting in the bottom of said scraper and adapted to be raised by the entrance of material under said member, means for limiting the upward movement of said member to thereby control the amount of material carried by said scraper, and means for returning the rear end of said member to the bottom of the scraper when the load has been discharged.

5. In a bottomless drag scraper, a cross bar connecting the upper forward ends thereof, a load control member having arms rigidly secured thereto and pivotally mounted on said bar to permit the rear end of said member to be normally moved from the bottom to the top of said scraper by the material entering the same, means for limiting the upward movement of said member to thereby control the amount of material carried by said scraper, and means for returning the rear end of said member to the bottom of the scraper when the load has been discharged.

6. In a bottomless drag scraper, a load control member pivoted at its forward end to the upper front end of said scraper and having its rear end normally resting in the bottom of said scraper and adapted to be raised by the entrance of material under said member, a bar on the rear end of said member having means thereon for limiting the upward movement of said member to thereby control the amount of material carried by said scraper, and means for returning the rear end of said member to the bottom of the scraper when the load has been discharged.

7. In a bottomless drag scraper, a load control member for predeterminately fixing the amount of load to be carried by said scraper, and means extending from the front of the side walls of said scraper for accomplishing side cutting.

8. In a bottomless drag scraper, a load control member for predeterminately fixing the amount of load to be carried by said scraper, and means hinged to the front of the side walls of said scraper for accomplishing side and under cutting.

9. In a bottomless drag scraper, a load control member for predeterminately fixing the amount of load to be carried by said scraper, and cutting plates extending from the front of the side walls of said scraper for accomplishing side and under cutting.

10. In a bottomless drag scraper, a load control member for predeterminately fixing the amount of load to be carried by said scraper, and cutting plates hinged to the front of the side walls of said scraper for accomplishing side and under cutting.

11. In a bottomless drag scraper, a load control member pivotally mounted so that its rear end rises and falls in said scraper, cutting plates hinged to the front of the side walls of said scraper, a cross bar tying said plates together, and means connecting said control member and said side plates whereby the forward edges of said plates are disposed at an angle to the line of draft of said scraper when the rear end of said control member is at the bottom of said scraper and adapted to be drawn into a position parallel with the line of draft as the rear end of said member rises.

12. In a bottomless drag scraper, digging members connected with said scraper, and an automatic load control member operatively connected to said digging members for regulating the cutting angle thereof in accordance with the amount of load.

13. In a bottomless drag scraper, a load control member pivoted at its front end and having its rear end adapted to rise and fall in said scraper, digging members connected with the front edge of the side walls of said scraper, and means through which said control member is adapted to control the cutting angle of said digging members by the rise and fall of its rear end.

14. In a bottomless drag scraper, a cross bar extending between the upper forward ends thereof, a load control member having its rear end adapted to rise and fall in said scraper, forwardly extending arms secured at one end to said control member and pivotally secured to said cross bar, digging members hinged to the front edges of the side walls of said scraper, a cross bar connecting said digging members, a pair of chains having one end of each secured to opposite sides of the scraper and having the other end of each secured to the digging member on the opposite side wall, and means engageable with said chains for angling said digging members with respect to the line of draft of said scraper when the rear end of said control member is falling to the bottom of said scraper.

15. In a bottomless scraper, a cross bar extending between the upper forward ends thereof, a load control member adapted to rise and fall in said scraper, forwardly extending arms secured at one end of said control member and pivotally secured to said bar, digging members hinged to the front edge of the side walls of said scraper, a cross bar connecting said digging members, a chain having one end secured to one side wall of the scraper and the other end secured to the digging member on the opposite side wall of the scraper, means engaging in and adapted to raise the bight of the chain as the load control member swings downward, thereby exerting tension on the digging members that will force said digging members at an angle with respect to the parallel portions of the side walls.

16. In a bottomless scraper, a cross bar extending between the upper forward ends thereof, a load control member adapted to rise and fall in said scraper, forwardly extending arms secured at one end of said control member and pivotally secured to said bar, digging members hinged to the front edges of the side walls of said scraper, a cross bar connecting said digging members, a chain having one end secured to one side wall of the scraper and the other end secured to the digging member on the opposite side wall, said chain being adjustable in length to stop the digging member approximately parallel with the center line, means engaging in and adapted to raise the bight of the chain as the load control member swings downward thereby exerting tension on the digging member that will force said digging member at an angle with the parallel portions of the side walls, a second chain having one end secured to the other side wall and the other end secured to the digging member on the first mentioned side wall, said chain being adjustable in length to stop the digging member at a predetermined angle with the parallel portions of the side walls, means engaging in and adapted to thrust the bight of said second chain downward as the load control member swings upward, thereby exerting tension on the digging members that will force said digging members on a line with the parallel portion of the side walls.

17. In a bottomless drag scraper, a load control member pivoted to said scraper, and means carried by said scraper and operatively connected with said load control member for diverting the course of said scraper.

18. In a bottomless drag scraper, a load control member pivoted to said scraper, and means carried on the forward end of said scraper and operatively connected with said load control member for diverting the course of said scraper.

19. In a bottomless drag scraper, a load control member pivoted to said scraper, and means pivotally carried on the forward end of said scraper and operatively connected with said load control member for diverting the course of said scraper.

20. In a bottomless drag scraper, a load control member pivoted to said scraper, and means pivotally carried on the opposite sides of said scraper and simultaneously operated by said load control member for diverting the course of said scraper.

21. In a bottomless drag scraper, a load control member pivoted to said scraper, cutting members pivoted to the forward end of said scraper, a member pivoted to said scraper and operatively connected to said load control member, and means pivotally connected to the forward end of the member pivoted to the scraper and operatively connected with said cutting members for controlling the cutting angle thereof.

22. In a bottomless drag scraper, a load control member pivoted at its front end and having its rear end adapted to rise and fall in said scraper, cutting members pivotally connected to the forward end of said scraper, a member fulcrumed intermediate its ends on said scraper and operatively connected to said load control member, a pair of chains having one of their ends connected to said scraper and the other of their ends connected to their respective cutting members, and a plurality of members pivoted to said fulcrumed member and connected to the intermediate portions of said respective chains for operatively connecting said cutting members with said load control member.

23. In a bottomless drag scraper, a load control member for predeterminately fixing the amount of load to be carried by said scraper, and cutting means operatively connected to said control member and automatically controlled thereby in accordance with the load.

24. In a bottomless scraper, a load control member for predeterminately fixing the amount of load to be carried by said scraper, digging members, and means controlled by said load control member for regulating the cutting angle of said digging members by the rise and fall of said control member.

25. In a bottomless scraper, a floating member hingedly mounted and adapted to rise with the material entering said scraper and fall when said scraper is empty, digging members hinged to the front of the side walls of said scraper, and means controlled by the fall of said floating member for forcing said digging members in a position to dig from the side and by the rise of said floating member for forcing said digging members to a neutral position when the scraper is loaded.

26. In a bottomless scraper, a load control member for predeterminately fixing the amount of load to be carried by said scraper, digging members connected with the front edges of the side walls of said scraper, and means for controlling the cutting angle of said digging members by the rise and fall of said control member.

27. In a bottomless scraper, a floating member hingedly mounted and adapted to rise with the material entering said scraper and fall when said scraper is empty, digging members hinged to the front of the side walls of said scraper, and means through which said floating member is adapted to force the digging member in position to dig from the side by the fall of said floating member and to force said digging member to a neutral position by the rise of the floating member when the scraper is loaded.

28. In a bottomless scraper, a load control member for predeterminately fixing the amount of load to be carried by said scraper, digging members connected with the front edges of the side walls of said scraper, and means through which said load control member is adapted to control the cutting angle of said digging members by the rise and fall of said control member.

In witness of the foregoing I affix my signature.

LESLIE P. GREEN.